United States Patent [19]
Seiler et al.

[11] Patent Number: 5,559,953
[45] Date of Patent: Sep. 24, 1996

[54] METHOD FOR INCREASING THE PERFORMANCE OF LINES DRAWN INTO A FRAMEBUFFER MEMORY

[75] Inventors: Larry D. Seiler, Boylston, Mass.; Robert S. McNamara, Bolton; Christopher C. Gianos, Sterling, all of Mass.; Joel J. McCormack, Woodside, Calif.

[73] Assignee: Digital Equipment Corporation, Maynard, Mass.

[21] Appl. No.: 270,189

[22] Filed: Jul. 1, 1994

[51] Int. Cl.⁶ .................................................. G06F 15/00
[52] U.S. Cl. ...................... 395/164; 395/162; 395/166; 345/189; 345/190
[58] Field of Search ................................. 395/143, 162, 395/164, 166, 165; 345/186, 187, 189, 190, 200, 201, 203

[56] References Cited

U.S. PATENT DOCUMENTS

| 5,349,372 | 9/1994 | Sellers | 345/185 |
| 5,398,316 | 3/1995 | Guttag | 395/164 |
| 5,404,448 | 4/1995 | Bowen | 395/164 |

OTHER PUBLICATIONS

IBM Microelectronics catalog, RGB561, Workstation Graphics, Preliminary Rev. 1.0, Mar. 23, 1994, pp. i–66.

*Primary Examiner*—Mark R. Powell
*Assistant Examiner*—U. Chauhan
*Attorney, Agent, or Firm*—Lindsay G. McGuinness; Denis G. Maloney; Arthur W. Fisher

[57] ABSTRACT

An apparatus and method for storing pixel data in a video memory having a plurality of slices increases the performance of line drawing by ensuring that for a given pixel, neighboring pixels in neighboring scan lines are stored in separate slices of video memory. One embodiment of the invention includes the step of appending a number of offset bits to the end of each scan line, where the number of offset bits is less than the total number of bits contained in the plurality of slices. Another embodiment of the invention rearranges the pixels of every other scan line. Another embodiment adds an offset number of pixels which is equal to the number of pixels per slice times the number of slices, then alternates ordered pixels with rearranged pixels throughout successive scan lines. Performance is further increased by providing a plurality of memory controllers corresponding to the plurality of slices of memory which may operate asynchronously to interleave memory access commands. Therefore, during line draw operations successive pixels which reside in different slices of memory may be accessed in one command, and subsequent accesses may be interleaved to further increase the performance of line drawing operations.

8 Claims, 7 Drawing Sheets

METHOD FOR INCREASING THE PERFORMANCE OF LINES DRAWN INTO A FRAMEBUFFER MEMORY

FIELD OF THE INVENTION

This invention relates generally to the field of computer systems and more specifically to a method for displaying information from a computer system.

BACKGROUND OF THE INVENTION

As it is known in the art, a computer processing system generally includes a computer processor for executing an instruction stream which is stored on a memory or a disk. A variety of software applications may be executed simultaneously by the computer processing system. One of these applications controls the images which are displayed on a monitor coupled to the computer processing system. The computer processing system often includes specialized graphics hardware and software to control the image information that is displayed on the monitor.

Graphics hardware typically includes a graphics controller and a video frame buffer. The graphics controller receives commands from the computer processing system to control the manipulation of data within the frame buffer. The graphics controller may include logic to increase the performance of a variety of graphics functions such as copying data from memory to the frame buffer, drawing lines, or stippling data.

The graphics controller provides an address and data to the video frame buffer. The data is provided in the form of binary pixels, where each pixel comprises color or intensity information. For example, in a gray-scale system, a pixel may comprise one byte of intensity data which would distinguish $2^8$ (256) different shades of gray ranging from black to white.

Each monitor has defined display dimensions for the number of vertical and horizontal pixels which are displayed on the screen of the monitor. Each row of horizontal pixels which are displayed is referred to as a 'scan line'. The width of the display is determined by the number of pixels in the scan line, and the height of the display is defined by the number of scan lines in the image.

The frame buffer is generally comprised of Dynamic Rams (DRAMS) or videoRAMs, where each videoRAM has both a random access memory (RAM) device and a shift register. During normal operation, rows of videoRAM data are repeatedly transferred to the shift register. The output of the shift register provides a constant serial stream of pixels to a digital to analog converter which in turn provides a constant stream of analog pixel data to the monitor.

When the computer processor performs a graphics operation, it updates the pixel data in the videoRAMS. The updated data is displayed on the screen the next time the pixel data is shifted out of the shift register. Graphics performance is typically measured by how fast the graphics controller can update data in the videoRAMs.

One graphics operation which typically has low performance compared to other types of operations is line drawing. Non-horizontal lines are slow due to the traditional organization of video frame buffer memory. Traditionally, video memory is organized such that a pixel of one scan line is stored in the same videoRAM device as the same pixel in the next adjacent scan line. As a result, when a non-horizontal line crosses scanlines, successive pixels of the line may be written to different addresses in the same RAM device. Vertical lines, in particular, are the worst case in terms of performance because all pixels of the line are written to the same videoRAM device. Successive writes to the same videoRAM device are undesirable because the writes cannot be performed in parallel, but must be performed sequentially and thereby reduce graphics performance.

For example, referring now to FIG. 1, an example arrangement of a video memory 10 is shown to store a plurality of 32 pixel scan lines 12a–12k, where each pixel is designated by its pixel location in the scan line. An operation to draw a vertical line on the display may alter color data in pixel 10 of each scan line 12a–12k as shown in FIG. 1, where the altered pixels of the vertical line are shown as outlined group 13.

A video bus 16 is a 64 bit bus coupled to transfer data to and from video memory 10. Providing 64 bits of write data per memory cycle increases the performance of the graphics processor by increasing the number of pixels in video RAM which can be altered during one memory transaction.

However, it is noted that in the prior art layout shown in FIG. 1, because each pixel of the vertical line is stored in the same videoRAM device, a separate memory transaction must occur for each pixel of the vertical line. These memory transactions cannot occur in parallel, but must be performed sequentially. As a result, only 8 bits of the 64 bit bus are used to carry pixel information, while the remaining portion of the bus is unused.

It would be desirable to identify a simple method for increasing the performance of non-horizontal line drawing without impacting the performance of other modes of graphics operations.

SUMMARY OF THE INVENTION

In accordance with the present invention, a method for storing a plurality of pixels forming a plurality of scan lines in a video memory, the video memory apportioned into a plurality of slices of memory, each of the slices of memory accessed by a corresponding plurality of controllers, the method comprising the step of allocating each of the pixels of the scan lines to predetermined ones of the plurality of slices of memory such that a plurality of successive pixels forming a line in the video memory may be accessed in parallel by the plurality of controllers.

According to one aspect of the invention, the method further includes the steps of appending an offset number of pixels to each of the plurality of scan lines, the offset number selected responsive to the number of plurality of slices of the video memory, the number of pixels in the horizontal display line, and the width of a slice of the video memory. In accordance with another aspect of the invention the method includes the steps of rearranging pixels in alternate scan lines, said step of rearranging including the step of swapping the pixels stored in the high order plurality of slices with the pixels stored in the low order plurality of slices. With such an arrangement the performance of line drawing is increased because any line drawn through memory will always touch at least one different slice before repeating a slice. Thus successive memory operations of line drawing may always be interleaved maximally, and thereby a graphics system having increased performance when line drawing operations cross scanlines is provided.

BRIEF DESCRIPTION OF THE DRAWINGS

FIG. 4A illustrates a scan line memory layout according to the invention for display on the monitor of FIG. 2;

FIG. 4C illustrates a scan line memory layout according to another aspect of the invention for display on the monitor of FIG. 2; and FIG. 4D illustrates a scan line memory layout according to another aspect of the invention for display on the monitor of FIG. 2.

DESCRIPTION OF THE PREFERRED EMBODIMENT

Figure 2:
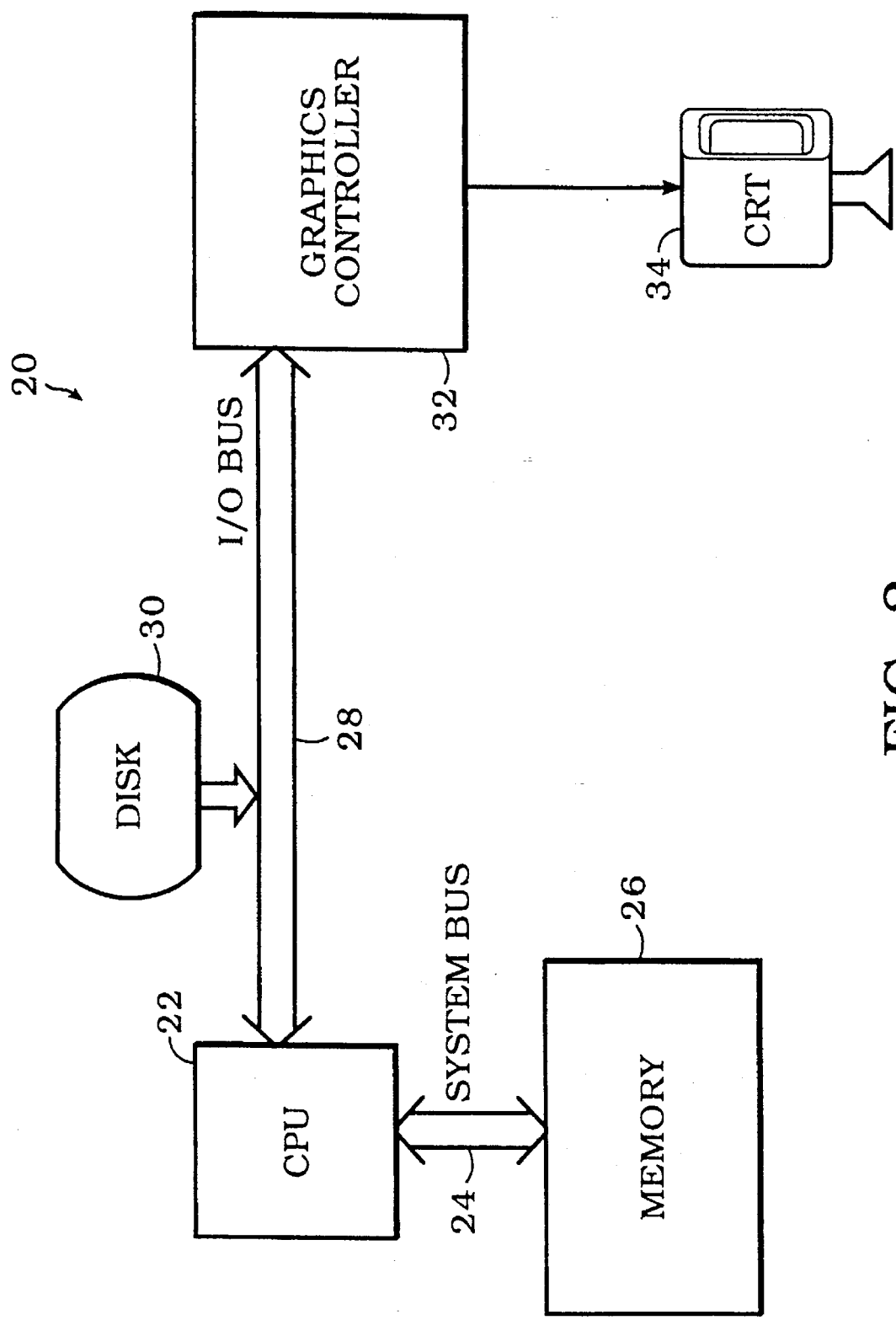
FIG. 2 illustrates a computer system for operation with the invention.

Referring now to FIG. 2, a computer system 20 according to the invention is shown to include a Central Processing Unit (CPU) 22, coupled via a system bus 24 to communicate with a memory 26. The CPU 22 is also coupled via an Input/Output (I/O) bus 28 to communicate with external devices such as a disk controller 30 or a graphics controller 32. The graphics controller 32 is coupled to provide image data to a Cathode Ray Tube (CRT) monitor 34.

During operation of the computer system 20, the CPU 22 operates on applications using an instruction stream stored in memory 26. Many of the applications run on CPU 22 provide image data or drawing requests to be displayed on CRT 34. Generally a software program, known in the art as a graphics driver, controls the display of image data or drawing requests provided by different applications on the CRT by providing appropriate address, data, and drawing commands over the I/O bus 28 to the graphics controller 32. The commands may include commands to copy data from memory 26 to a memory in the graphics controller 32, or commands such as line drawing, or stippling of bitmaps into pixels to paint patterns or text.

The I/O bus 28 is a bus which is adapted to communicate through a defined protocol with external devices, such as a disk, console, etc. There are a variety of I/O busses currently available in the market, each of which have their own defined protocol. The I/O bus 28 used in one embodiment of the invention operates according to the TURBOchannel™ protocol, and thus an interface of the graphics device 32 is designed in accordance with the TURBOchannel™ protocol. The TURBOchannel™ bus is a high performance bus capable with a bandwidth equal to 100 MBytes/sec. It is to be understood that this invention could be adapted to a system arrangement using another I/O bus protocol or connecting the graphics controller 32 to the system bus 24 by one of ordinary skill in the art.

Figure 3:
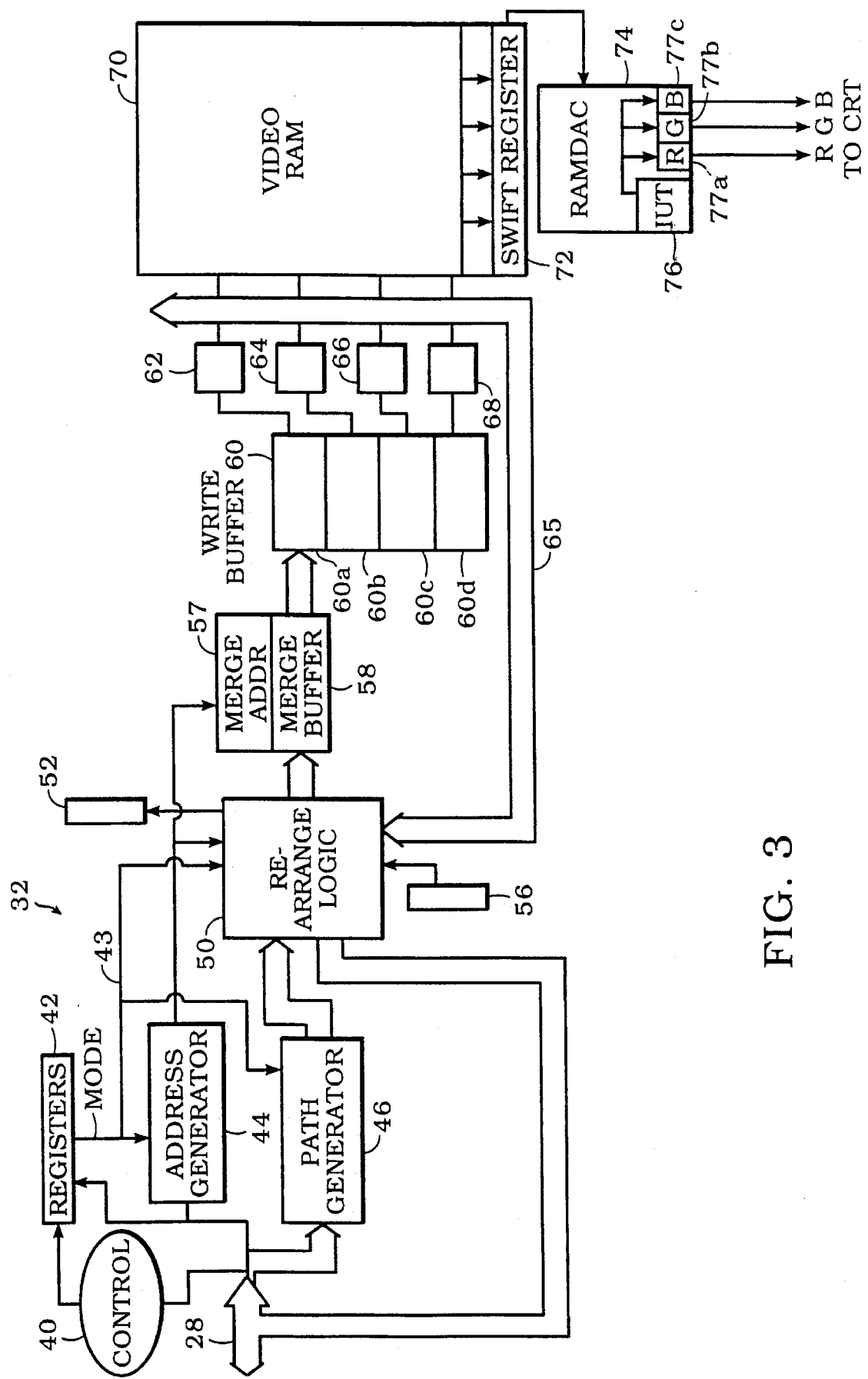
FIG. 3 illustrates a graphics controller for use in the computer system of FIG. 2.

Referring now to FIG. 3, the graphics controller 32 of the present invention is shown to include control logic 40 for decoding the commands received on I/O bus 28. The control logic 40 is coupled to provide control signals to register logic 42. Register logic 42 includes a plurality of registers for storing information about the mode of operation, length of the scan line of the display, and other similar information of use to the graphics controller. Register logic 42 provides this information via control data lines 43 to address generator 44. Data generator 46 is coupled to receive data from I/O bus 28, as well as data from registers 42. The data generator 46 provides data to rearrange logic 50, which may rotate data by an amount computed from the data address and from the contents of source rotate register 52 or dest rotate register 56. In addition, the rearrange logic includes hardware to rotate the pixel data based either on the address provided by address generator 44, or on the Y position of the pixel data on the screen. The rearrange logic 50 provides data to a merge buffer 58.

The merge buffer 58 is a 64 bit buffer that is coupled to a write buffer 60 apportioned into four 16 bit sub-buffers 60a through 60d. Each 16 bit buffer is coupled to a corresponding memory controller 62, 64, 66, and 68. The memory controllers 62–68 control the transfer of data between the write buffer 60, a video bus 65 and a video memory 70.

Data from the video memory 70 is periodically transferred to video shift register 72, and serially shifted out to a digital to analog converter (RAMDAC™) 74. The pixel data provided to RAMDAC™ 74 is used to access a color Look Up Table (LUT) 76 which outputs 8 bits of Red, 8 bits of Green and 8 bits of Blue data. Each 8 bits of color data is fed to the corresponding digital-to analog converter, 77a, 77b, and 77c, respectively, and these three analog signals are sent to the CRT.

During operation, data and graphics commands are provided to the graphics controller 32 via I/O bus 28. The type of operation to be performed using the incoming data is selected via the command mode stored in register logic 42. When the command mode specifies line drawing, the address generator 44 uses information from register logic 42 and I/O bus 28 to provide successive pixel addresses of points in the line to the merge address register 57.

Each address provided by address generate logic 44 is compared against the address stored in merge address register 57. The merge buffer is a 64 bit wide buffer. If it is determined that the address provided by address generate logic 44 and the address in the merge address register 57 reference the same 64 bit word, the data from the rearrange logic 50 is merged with the data in the merge buffer 58.

The advantages gained by the merge buffer 58 are best understood when the computer system is displaying lines that are more horizontal than vertical, and thus sometimes step horizontally from one pixel to the next. The series of commands received over bus 28 to generate the lines will sometimes write to several contiguous horizontal pixels of video memory 70. If the write operations affect pixels within the same 64 bit word, each incoming data byte is merged with the existing data bytes in the merge buffer 58. Thus, if the line is more horizontal than vertical, up to eight separate pixels from address generator 44 can be merged into one 64 bit memory access.

Either when the merge buffer 58 is full, when the address provided by address generate logic 44 is not in the same 64 bit word as the address in the merge address register 57, or when the address generator becomes idle, the contents of the merge buffer 58 are shifted into the write buffer 60. Thus, the merge buffer provides a mechanism for reducing the number of memory references by increasing the utilized pixels of the video bus 65.

The write buffer 60 is a first-in first-out fifo buffer which is divided into four 16 bit sub-buffers, 60a–60d, each of which is independently controlled by a dedicated memory controller 62–68 respectively. The memory controllers may operate synchronously, to provide simultaneous access to 64 consecutive bits of video memory 70, or independently, so that the video memory 70 may be accessed as four separate 16 bit slices. During each memory transaction, the memory controller may update either the upper 8 bits of the slice, the lower 8 bits of the slice, or all 16 bits of the slice. By allowing the accesses to video memory 70 to be sliced, overall graphics performance may be increased because references to different slices of memory may occur simultaneously.

One of the problems that dividing memory into multiple slices cannot alone remedy is the performance problem associated with drawing non-horizontal lines in video memory 70. Referring again briefly to FIG. 1, it can be seen that to draw a vertical line, the same pixel in successive scan lines is affected by the draw operation. The pixels of the vertical line 13 are outlined. Due to the typical layout of video memory, the same pixel location of two successive scan lines is located in a different location of the same RAM as the pixel location of the previous scan line. For example, given a scan line comprising 1280 pixels, to draw a vertical line originating at address 'p' of the first line, the successive addresses of the vertical line are p, p+1280, p+2560, p+3840, p+5120, and p+6400. Given an arrangement which is 8 bytes wide, the byte position on the bus associated with a given address is the address modulo 8. Looking back at the six addresses which are written to provide the vertical line, it is evident that all 6 addresses utilize the same byte position, namely p modulo 8.

Thus, with such a scan line allocation, slicing provides no benefit because all the pixels of the line reside in the same slice of memory. Thus in the case of drawing a vertical line, only one pixel of the 32 bit bus is utilized for each memory transaction. It is to be understood that vertical lines are merely the most extreme case of inefficiency. Any line that sometimes crosses from one scanline to another with a vertical step will cause two successive writes to the same slice, which then require two separate, sequential memory transactions.

Figure 4A:
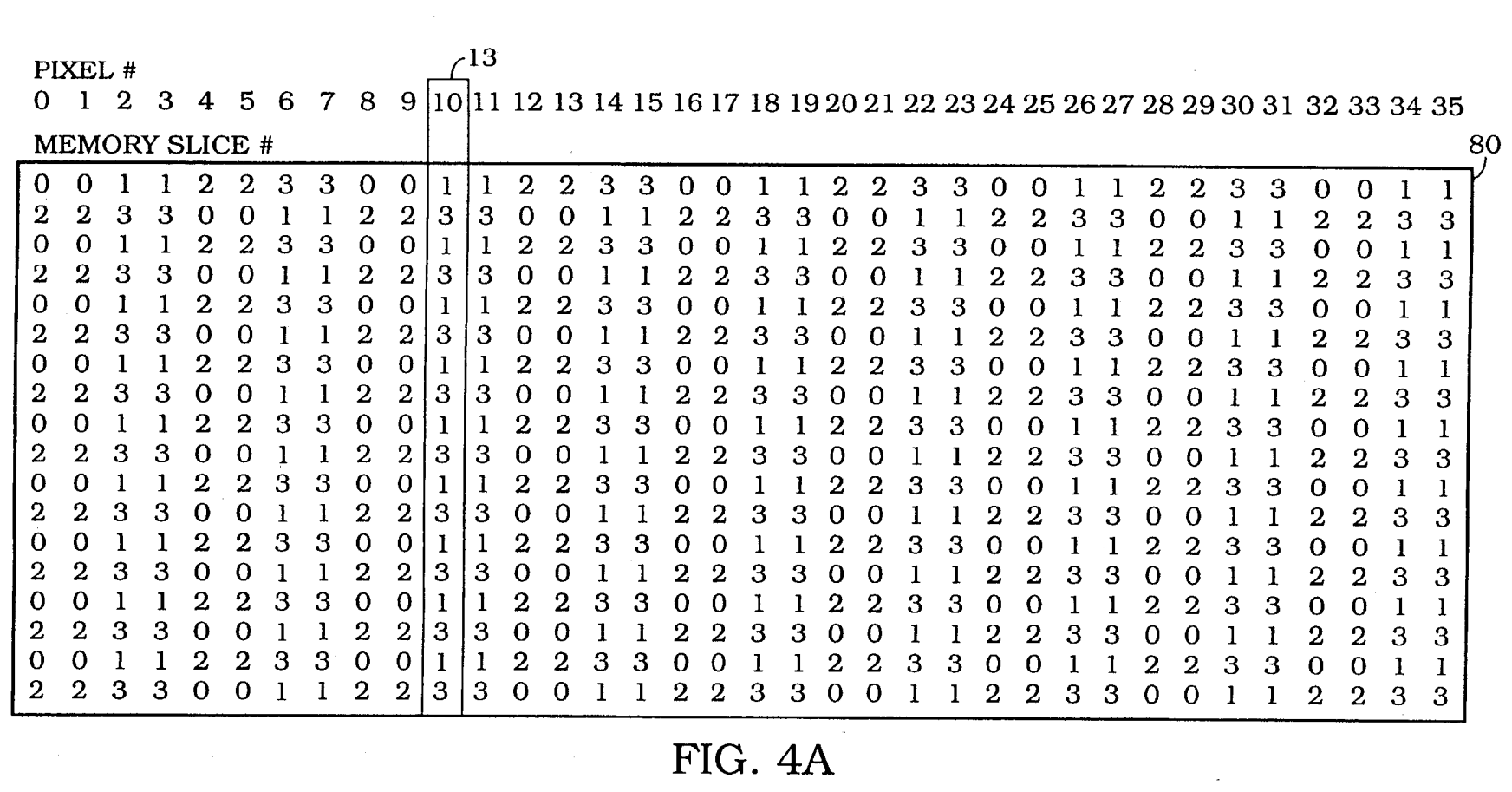
Figure 4B:
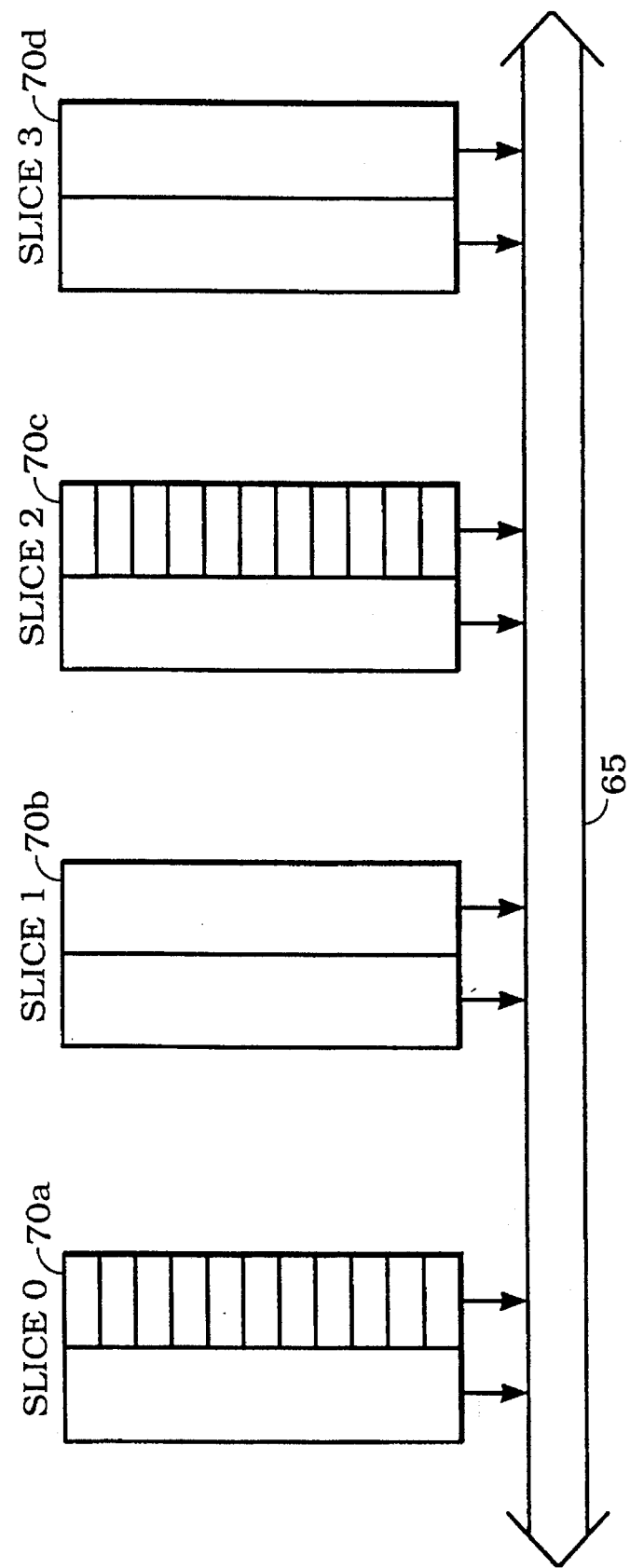
FIG. 4B illustrates the allocation of the scan line memory layout into a video memory of FIG. 3.

Referring now to FIG. 4A, an example video RAM layout 80 where the length of each scan line has been increased by four pixels is shown. As opposed to FIG. 1, where one memory was shown to comprise a scan line having 32 pixels, in FIG. 4A and 4B, the video memory 70 stores a series of scan lines each having 36 pixels per scan line in 4 slices of memory, 70a–70d. The video memory is allocated such that two pixels are stored in each memory slice 70a–70d.

In FIG. 4A, each pixel of the 32 pixel scan line is designated by a number 0–3, indicating the number of the slice of video memory 70 in which it is stored. The four extra pixels which are appended to each scan line need not be displayed, rather the extra allocated pixels serve to offset the addresses of the respective pixels in successive scan lines from each other to allow for parallel memory references to different slices and thus increased performance.

Figure 1:
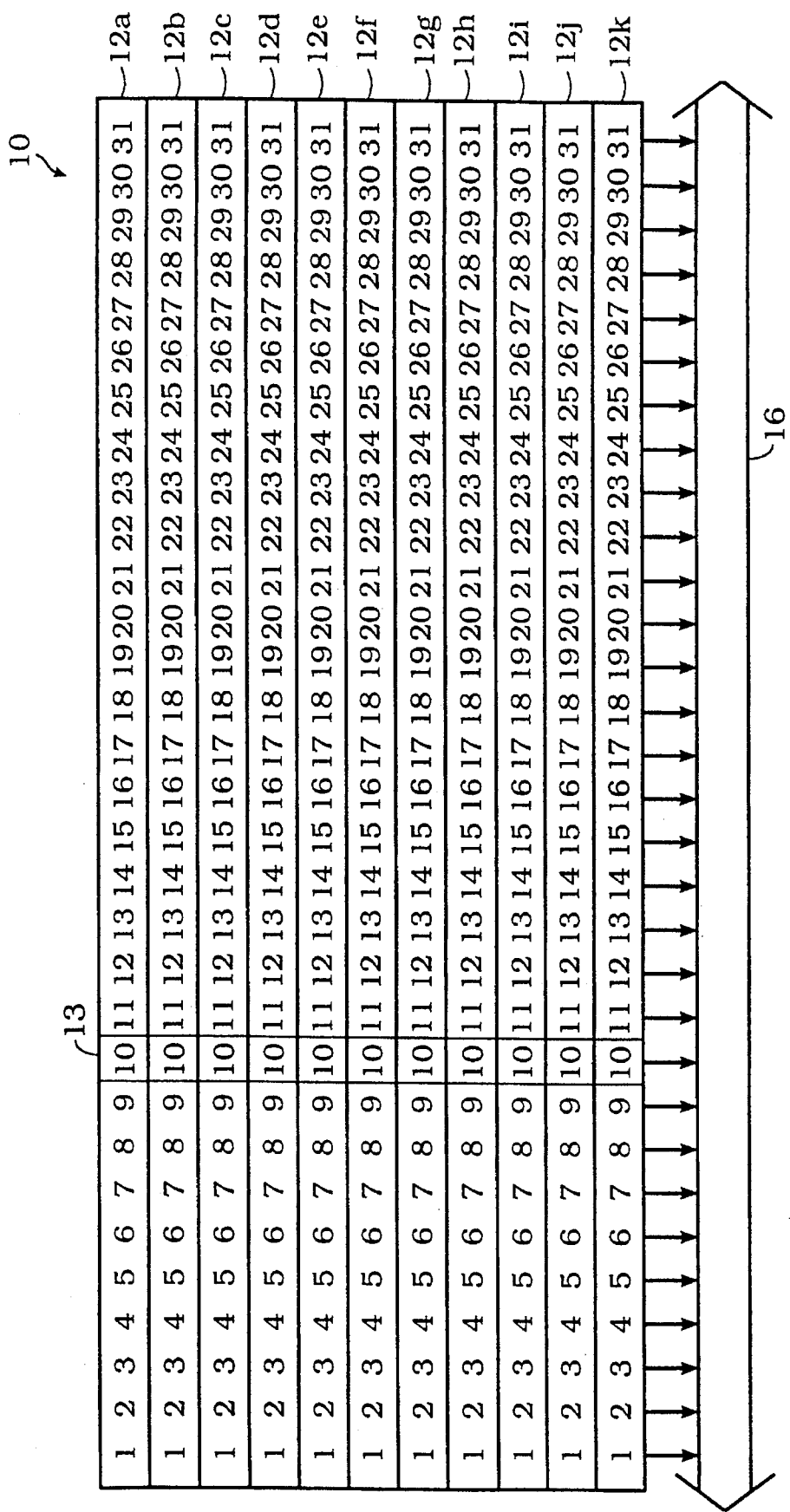
FIG. 1 illustrates a prior art allocation of scan lines in a video memory.

In FIG. 4A, because four extra pixels have been added to the length of the scan line as shown in FIG. 1, the scan line comprises more pixels than may be evenly distributed between the slices of video memory 70. As a consequence, using the example of a vertical line originating at pixel 10 of the display, it can be seen that successive pixels along the vertical line are obtained from different slices of video memory 70.

As shown in FIG. 4B, because successive pixels in a vertical line are not located in the same slice of video memory, two pixels may be altered during each access of video memory 70, and thus the performance of line drawing is increased. Also, by arranging the slices such that either or both of the pixels stored in each slice is updated with one memory access, the performance of lines having some horizontal pixels is not adversely affected.

Using the above example where p is the address of the first pixel in the vertical line, the addresses of subsequent pixels are p+1284, p+2568, p+3836, and p+5128. Thus, the byte position used to address the pixels of the vertical line will alternate between p modulo 8 and p+4 modulo 8. Such an arrangement is ideally suited for memory interleaving because it allows for two memory references to be made during one video memory access cycle. Note that stepping along any line at any angle originating from any point in the display will either access two horizontally successive pixels stored in the same slice of video memory, in which case they can both be written by the memory controller in a single memory transaction, or will access pixels in different slices, in which case they can be written in parallel by different memory controllers.

Referring again briefly to FIG. 3, the memory controllers 62, 64, 66, and 68 operate independently during line mode in order to allow interleaving of memory accesses to the two or more different slices. Optimum performance would provide for each memory controller operating on a different memory slice during the same clock interval. However, design constraints often limit the amount of available hardware which may be dedicated to the video memory interface.

Similar performance results can be obtained by interleaving the accesses to the video memory. Here, two clock cycles are required to retire data to video memory. By interleaving memory accesses such that two memory controllers operate on even clock cycles, and two memory controllers operate on odd clock cycles, similar performance to allowing all the memory controllers to operate on the same clock tick is achieved without additional hardware overhead.

During operation, the memory controllers 62 and 66 operate on even clock cycles to retrieve data from corresponding write buffer locations 60a and 60c and provide the write data to the video ram 70. While the memory controllers 62 and 66 are updating video ram 70, the memory controllers 64 and 68 are preparing to write the next two locations of video memory with data from corresponding write buffer locations 60b and 60d. When the memory controllers 62 and 66 have updated the video memory 70, they are free to retrieve more data while the memory controllers 64 and 68 update video memory.

The interleaving of memory references may additionally be controlled by driving each of the respective pairs of memory controllers 62/66 and 64/68 by complementary clocks. Other methods known to those of skill in the art may also be used depending on the constraints of the memory design.

Although the above description includes a video memory divided into four slices, the present invention may be adapted to provide increased graphics performance for a graphics device having a video memory apportioned into any number of individual slices of memory. The optimum number of excess pixels per scan line for a variety of number of memory slices are shown below in Table 1.

TABLE 1

| Number of Slices in Video Memory | (scanline width in slices) modulo (number of slices) |
| --- | --- |
| 2 | 0 or 1 |
| 4 | 2 |
| 8 | 2 |
| 16 | 4 |

As seen in Table 1, for two slices of video memory, there is no single optimum offset between the scanlines; an offset of 0 adversely affects vertical lines, while an offset of 1 adversely affects diagonal lines. Where there are two slices to video memory, if the width of each memory controller is a single pixel, an offset of 0 is preferred, because on average successive pixels in a line will step to a memory controller diagonally above or below more often than to a memory controller vertically above or below. If the width of each memory controller is two or more pixels, an offset of 1 is preferred, because on average successive pixels in a line will step to a memory controller vertically above or below more often than diagonally.

For four or more slices, the required offset amount is an offset which ensures that successive pixels in a line are always accessed using as many different memory controllers as possible, except when the pixel is horizontally contiguous, in which case the pixel may be retired by the same memory controller. Both the number of pixels stored in each slice as well as the total number of slices must be taken into consideration when determining the number of offset pixels to append to the scanline.

Figure 4C:
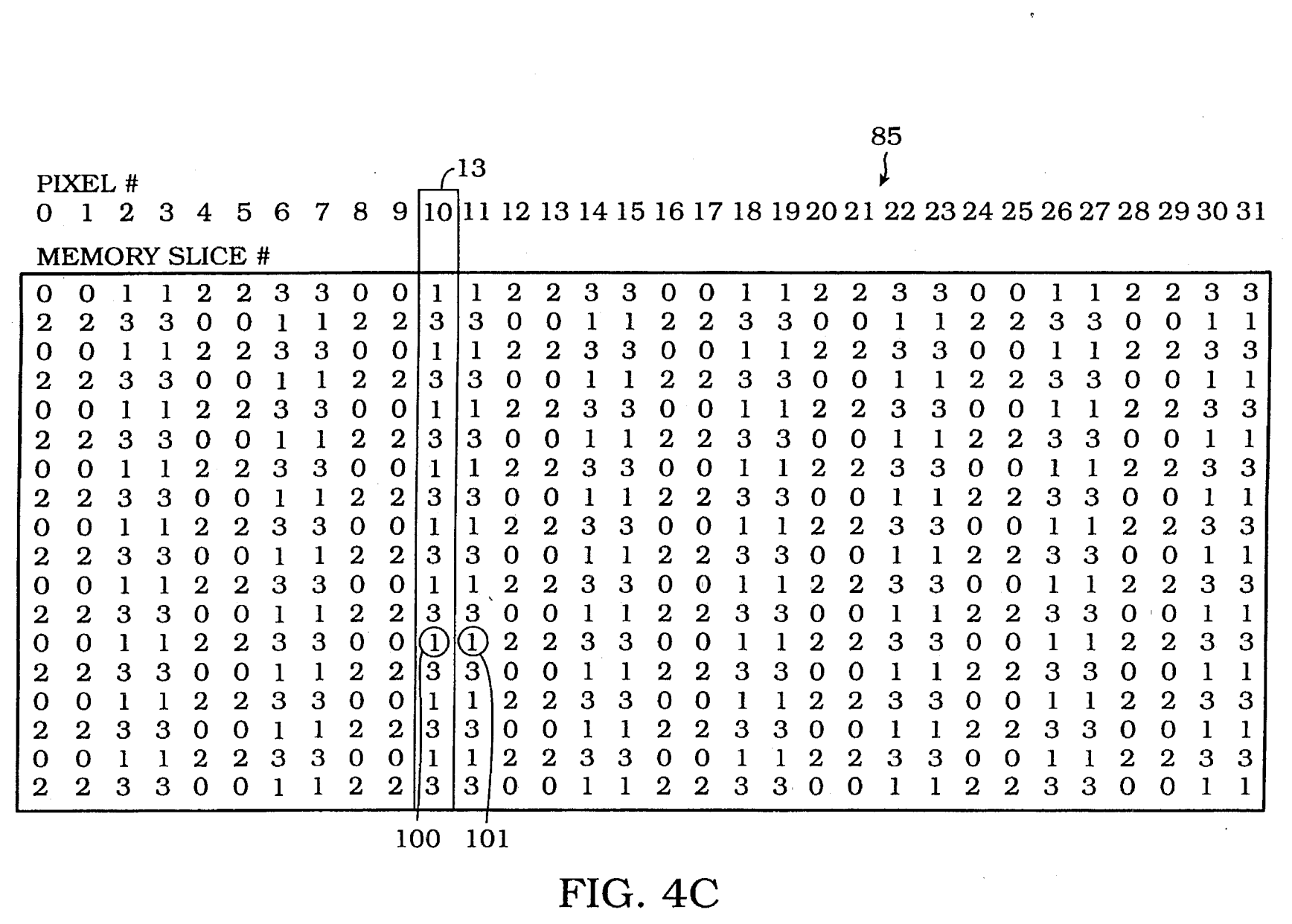

Referring now to FIG. 4C, a technique for achieving the above result without appending offset bits to the scan line is shown. In FIG. 4C, a video memory layout 85 is shown to include a plurality of 32 pixel scan lines, similar to that of FIG. 1. However, in FIG. 4C every other scan line in video memory is rearranged such that the 64 bit word has its upper and lower half swapped by hardware. By rearranging the word in this manner, successive pixels in a line will be able to be accessed in parallel by the memory controllers. For example, given pixel 100, the neighboring pixels are all stored in different slices of video memory with the exception of the neighboring pixel 101 which is stored in the same slice of video memory. Because pixel 101 is stored in the same slice of video memory, it may be accessed in the same memory transaction as pixel 100.

In order to implement this embodiment, the alternate scan lines are rearranged such that the low order pixels 0, 1, 2 and 3 are swapped with the high order pixels 4, 5, 6 and 7. Here the odd numbered scan lines are shown with the pixels of the scan line rearranged. The graphics controller 32 can identify the number of the scan line that is accessed in video memory. Referring again briefly to FIG. 3, after determining whether the scan line is even or odd, the rearrange logic 50 may be used to re-order the pixels of the scan line.

Figure 4D:
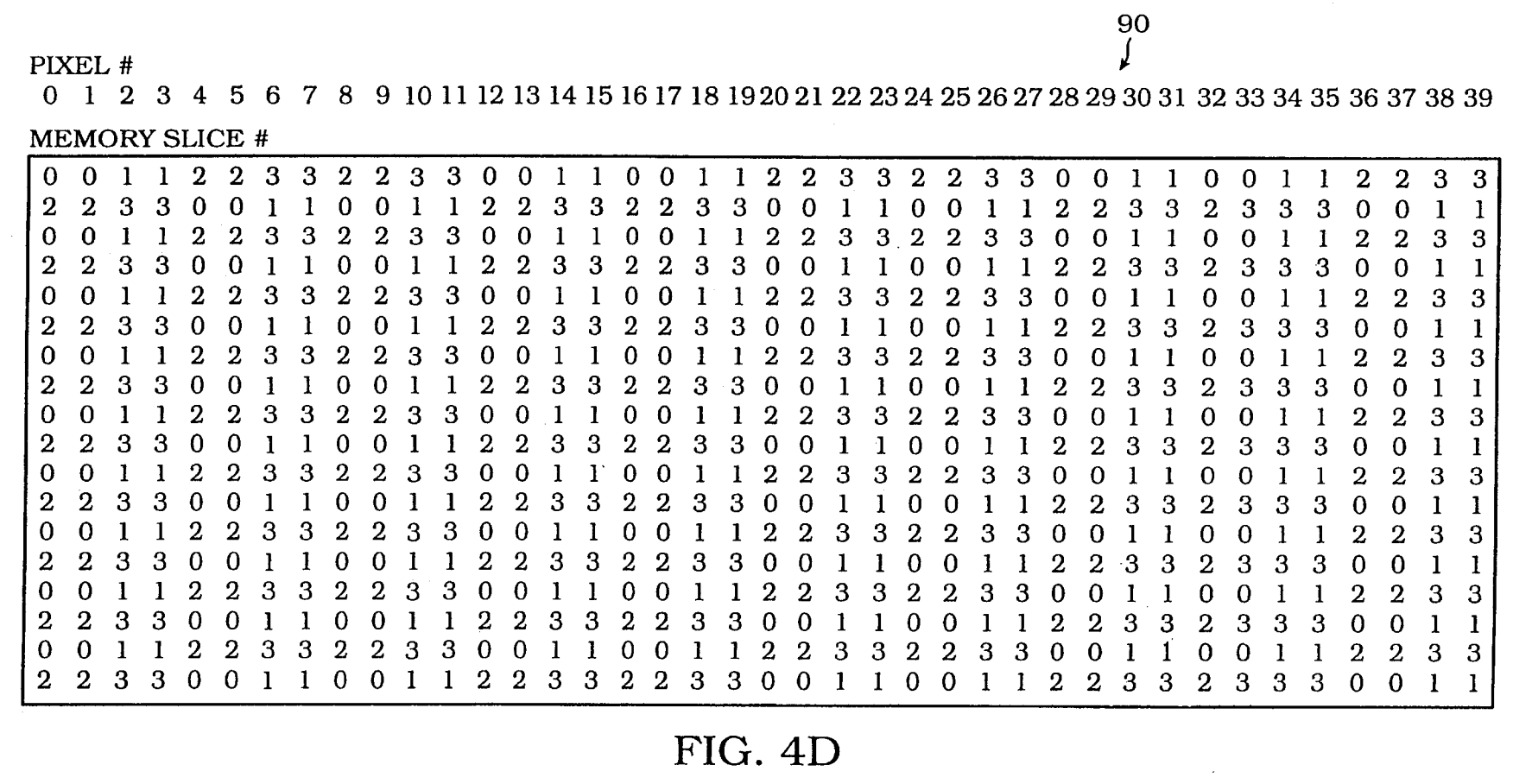

However, referring now to FIG. 4D, it can be seen that swapping the upper and lower half of a 64 bit word may be used in conjunction with adding an offset number of pixels to provide a video memory layout that enables the memory controllers to operate in parallel when drawing lines without requiring that hardware know on which scan line it is operating. In FIG. 4D, a video memory layout 90 is shown wherein every other 64 bit word has its upper and lower half swapped by hardware. In addition, 8 extra pixels are appended to the scan line. With this arrangement, hardware does not need to know which scan line it is working with. Rather, the hardware may routinely re-arrange every other 64 bit word into the correct order to obtain the correct result.

The pixel arrangement of FIG. 4D provides the advantages of the arrangement of video memory shown in FIGS. 4A and 4B with some additional benefits. By ensuring that the scan line width is an odd integer multiple of the number of pixels in a videoRAM word and rearranging the pixels in the above described manner, no changes need be made to the graphics software. In FIG. 4A, software complexity may be adversely affected because the scan line width is not an integer multiple of the number of pixels in a videoRAM word. This may require software routines to perform different actions upon even and odd scanlines. Using the layout of FIG. 4D, hardware may routinely rearrange the retrieved pixels without affecting the software applications.

As shown in any of FIGS. 4A, 4C, or 4D, it can be seen that in any drawn line, whatever the orientation, successive pixels in the line always step to a new memory controller, or are horizontally contiguous in the same memory controller. In each of the shown embodiments, the result is obtained by allocating pixels of a scan line to different slices of memory such that for a given pixel in a scan line, neighboring pixels of neighboring scan lines are allocated to different slices of memory than the slice in which the given pixel is allocated. The offset relationship allows for successive memory operations of line drawing to access different slices, thus providing a graphics system having increased performance. In addition, by providing memory slices able to be controlled by independent memory controllers, performance is further enhanced particularly during non-horizontal line draw operations.

The described graphics system utilizes the advantages of an atypical layout of pixels in a video memory layout to increase the utilization of the video bus and thereby increase overall graphics system performance. Having described a preferred embodiment of the invention, it will now become apparent to one of skill in the art that other embodiments incorporating its concepts may be used. It is felt, therefore, that this embodiment should not be limited to the disclosed embodiment, but rather should be limited only by the spirit and scope of the appended claims.

What we claim is:

1. A method for storing a plurality of pixels forming a plurality of scan lines in a video memory, said video memory apportioned into a plurality of slices of memory, each of said slices of memory accessed by a plurality of controllers, said method comprising the step of allocating each of said pixels of said scan lines to predetermined ones of said plurality of slices of memory such that a plurality of successive pixels forming a line in said video memory may be accessed in parallel by said plurality of controllers wherein said step of allocating further comprises the step of ordering the storage of successive pixels in a scan line in said plurality of memory slices to ensure that for a given pixel stored in a given slice of said plurality of slices, the neighboring pixels of neighboring scan lines are stored in different ones of said plurality of slices than said given slice.

2. The method according to claim 1, wherein said step of ordering further comprises the steps of:

appending a number of offset pixels to each of said plurality of scan lines, said number selected responsive to the number of plurality of slices of said video memory, the number of pixels in a horizontal display line, and a width of a slice of said video memory, said number selected to ensure that corresponding pixels of consecutive scan lines are not stored in a common one of said plurality of slices; and storing successive pixels of said scan line in respective consecutive ones of said plurality of slices.

3. The method according to claim 1, where the step of ordering further comprises the step of:

rearranging pixels in alternate scan lines, said step of rearranging including the step of swapping the pixels stored in a high order plurality of slices with the pixels stored in a low order plurality of slices.

4. The method according to claim 1, where the step of ordering further comprises the step of:

appending an offset number of pixels to the scan line, where said offset number of pixels is equal to the number of said plurality of slices multiplied by the number of pixels stored in each of said plurality of slices;

grouping said pixels of said scan line to form a plurality of groups of pixels, where a size of said each of said groups corresponds to the number of said plurality of slices of memory; and rearranging said pixels in alternate groups of said plurality of groups of pixels.

5. The method according to claim 1, further comprising the step of allowing said controllers to alternately access said corresponding slices of memory to interleave references to each of said slices of memory.

6. An apparatus for displaying pixels on a monitor comprising:

a video memory comprising a plurality of individual slices of memory, for storing a plurality of pixels forming a plurality of scan lines comprising a plurality of pixels, where each of said pixels of said scan lines are stored in predetermined ones of said plurality of slices of memory such that a plurality of successive pixels forming a line in said video memory may be accessed in parallel by a corresponding plurality of controllers and wherein said pixels are stored in said video memory such that neighboring pixels in neighboring scan lines are stored in a different slices of memory.

7. The apparatus of claim 6, further comprising:

a plurality of memory controllers corresponding to said plurality of slices of memory; and means for allowing said plurality of memory controllers to operate independently.

8. The apparatus of claim 7 wherein the number of offset bits ensures that for a given pixel stored in a particular slice of memory, neighboring pixels in neighboring scan lines are stored in a different slices of memory than said given pixel.

* * * * *